(12) United States Patent
Aso

(10) Patent No.: US 8,442,742 B2
(45) Date of Patent: May 14, 2013

(54) TORQUE CONTROL APPARATUS AND CONTROL METHOD FOR VEHICLE DRIVING UNIT

(75) Inventor: Koji Aso, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 840 days.

(21) Appl. No.: 12/599,130

(22) PCT Filed: Apr. 24, 2008

(86) PCT No.: PCT/IB2008/001009
§ 371 (c)(1),
(2), (4) Date: Nov. 6, 2009

(87) PCT Pub. No.: WO2008/139284
PCT Pub. Date: Nov. 20, 2008

(65) Prior Publication Data
US 2010/0241335 A1    Sep. 23, 2010

(30) Foreign Application Priority Data
May 10, 2007    (JP) .................... 2007-126033

(51) Int. Cl.
 *B60T 7/12* (2006.01)
 *G05D 1/00* (2006.01)
 *G06F 7/00* (2006.01)
 *G06F 17/00* (2006.01)

(52) U.S. Cl.
USPC ...... 701/103; 701/102; 701/110; 123/406.23; 123/406.5; 123/492

(58) Field of Classification Search .............. 701/102, 701/103, 104, 106, 110; 123/399, 435, 436, 123/492, 406.23, 406.45, 406.46, 406.47, 123/406.5, 406.52
See application file for complete search history.

(56) References Cited

U.S. PATENT DOCUMENTS 4,819,598 A * 4/1989 Mueller ................. 123/399
5,921,219 A    7/1999 Frohlich et al.
(Continued)

FOREIGN PATENT DOCUMENTS

DE    197 12 843    10/1998
DE    101 19 724    2/2003
(Continued)

OTHER PUBLICATIONS

Office Action issued May 24, 2011, in Japan Patent Application No. 2007-126033 (with English translation).

*Primary Examiner* — Willis R Wolfe, Jr.
*Assistant Examiner* — Anthony L Bacon
(74) *Attorney, Agent, or Firm* — Oblon, Spivak, McClelland, Maier & Neustadt, L.L.P.

(57) ABSTRACT

The prevention of the occurrence of a shock during acceleration is enabled without impairing acceleration response as to a control apparatus for a vehicle driving unit. By changing a control amount of a specific one or specific ones of the plurality of the control elements when a torque-up request is issued, the output torque of the vehicle driving unit is increased toward a target output torque. In this case, a torque gradient upon changing the control amount of the specific one or the specific ones of the control elements is estimated and calculated on the basis of a current output torque of the vehicle driving unit according to a calculation rule formulated in advance. The control amounts of the respective control elements including the specific one or the specific ones of the control elements are set such that the estimated torque gradient coincides with a predetermined target torque gradient.

13 Claims, 5 Drawing Sheets

U.S. PATENT DOCUMENTS

| | | | |
|---|---|---|---|
| 6,202,630 B1* | 3/2001 | Yip | 123/352 |
| 6,363,910 B1* | 4/2002 | Kreischer et al. | 123/339.16 |
| 6,631,319 B1* | 10/2003 | Luh | 701/54 |
| 7,937,211 B2* | 5/2011 | Aso | 701/110 |
| 2004/0049328 A1* | 3/2004 | Lee | 701/22 |
| 2004/0211609 A1* | 10/2004 | Schmitt | 180/197 |
| 2005/0065691 A1* | 3/2005 | Cho | 701/54 |

FOREIGN PATENT DOCUMENTS

| | | |
|---|---|---|
| DE | 10 2004 013 512 | 7/2005 |
| DE | 10 2004 005 728 | 8/2005 |
| EP | 37 38 719 | 7/1988 |
| EP | 0 631 897 | 1/1995 |
| FR | 2 718 191 | 10/1995 |
| JP | 9 323565 | 12/1997 |
| JP | 10-184431 | 7/1998 |
| JP | 2003 293812 | 10/2003 |
| JP | 2005-90339 | 4/2005 |
| JP | 2005-155412 | 6/2005 |
| JP | 2005-315180 | 11/2005 |

* cited by examiner

TORQUE CONTROL APPARATUS AND CONTROL METHOD FOR VEHICLE DRIVING UNIT

BACKGROUND OF THE INVENTION

1. Field of the Invention

The invention relates to a control apparatus and a control method for a vehicle driving unit which has a plurality of control elements and whose output torque is controlled in accordance with control amounts of the control elements.

2. Description of the Related Art

During acceleration of a vehicle, the vehicle may experience a shock when the torque output from a driving unit of the vehicle is excessively large. On the contrary, the occurrence of a shock can be prevented but a deterioration in acceleration response is caused when the outputting of the torque is excessively limited. As described hitherto, driveability is greatly affected by how to output a torque during acceleration. Therefore, various proposals have been made as to torque control of a vehicle. Arts regarding torque control of a vehicle are also disclosed in the following exemplary documents, namely, Japanese Patent Application Publication No. 2003-293812 (JP-A-2003-293812) and Japanese Patent Application Publication No. 9-323565 (JP-A-9-323565).

In the course of originating the invention, a new fact that the shock caused during acceleration of a vehicle changes depending on the operational state of a driving unit before acceleration has been ascertained. A case where the driving unit is an internal combustion engine will now be described. For example, it has been revealed that when a throttle is opened for acceleration, the ascending gradient of torque after the start of acceleration differs and the magnitude of a shock caused differs as well if the pressure in an intake pipe or the efficiency of filling the inside of each cylinder with air differs upon the opening of the throttle in spite of the same throttle opening degree.

SUMMARY OF THE INVENTION

The invention provides a control apparatus and a control method for a vehicle driving unit that make it possible to prevent the occurrence of a shock during acceleration without impairing acceleration response.

A first aspect of the invention relates to a control apparatus for a vehicle driving unit which has a plurality of control elements and whose output torque is controlled in accordance with control amounts of the control elements. This control apparatus is equipped with torque-up request receiving means for receiving a torque-up request issued to the vehicle driving unit from an outside, target output torque setting means for setting a target output torque of the vehicle driving unit when the torque-up request is received, torque-up control means for changing the control amount of a specific one of the plurality of the control elements or the control amounts of specific ones of the plurality of the control elements to increase the output torque of the vehicle driving unit toward a target output torque, torque gradient estimating means for estimating a torque gradient upon changing the control amount of the specific one of the control elements or the control amounts of the specific ones of the control elements on the basis of a current output torque of the vehicle driving unit according to a calculation rule formulated in advance, and control amount adjusting means for adjusting the control amount of at least one of the plurality of the control elements such that the estimated torque gradient approaches a predetermined target torque gradient.

According to the first aspect of the invention, the torque gradient upon changing the control amount of the specific one of the control elements or the control amounts of the specific ones of the control elements is estimated in advance, and the control amounts of the respective control elements are set such that the estimated torque gradient becomes equal to the target torque gradient. According to this configuration, the output torque can be changed with an optimal torque gradient regardless of the operational state of the vehicle driving unit, and the occurrence of a shock during acceleration can be prevented without impairing acceleration response.

The target torque gradient may be set such that a magnitude of a shock caused to a vehicle at the time of torque-up becomes equal to a predetermined permissible upper-limit value.

In this manner, acceleration response can be enhanced to the maximum possible extent while the magnitude of the shock caused during acceleration does not exceed the permissible value.

In the first aspect of the invention, the control apparatus may further be equipped with road surface gradient measuring means for measuring a gradient of a road surface, and target torque gradient correcting means for correcting the target torque gradient in accordance with the gradient of the road surface.

In this manner, the influence of the gradient of the road surface on the magnitude of the shock can be eliminated, and both the enhancement of acceleration response and the prevention of acceleration shock can always be achieved regardless of whether the vehicle is running uphill or downhill.

In the first aspect of the invention, the control apparatus may further be equipped with acceleration measuring means for measuring an acceleration acting in a longitudinal direction of the vehicle, and learning means for learning a correction amount of the target torque gradient for the gradient of the road surface on the basis of a longitudinal acceleration acting at the time of torque-up.

In this manner, the longitudinal acceleration actually acting on the vehicle at the time of torque-up is measured, and the correction amount of the target torque gradient for the gradient of the road surface is learned from a result of the measurement. Therefore, the target torque gradient can be set to an optimal value no matter how large or small the gradient of the road surface is.

The vehicle driving unit may include an internal combustion engine, and the specific one of the control elements may be an intake air amount control device of the internal combustion engine.

In this manner, the output torque can be increased by increasing the amount of intake air. A throttle disposed in an intake pipe or a variable valve operating system for driving intake valves can be employed as the intake air amount control device.

The control amount adjusting means may set an operation speed of the intake air amount control device to a maximum speed when the estimated torque gradient is smaller than the target torque gradient.

In this manner, by setting the operation speed of the intake air amount control device to the maximum speed, the amount of intake air can be suddenly increased and the output torque can be swiftly raised. According to this configuration, the torque gradient can be increased with ease.

The control amount adjusting means may limit the operation speed of the intake air amount control device when the estimated torque gradient is larger than the target torque gradient.

In this manner, by limiting the operation speed of the intake air amount control device, the amount of intake air can be limited and the output torque can be restrained from rising. According to this configuration, the torque gradient can be reduced without wasting energy.

The control amount adjusting means may retard an ignition timing of an ignition device of the internal combustion engine when the estimated torque gradient is larger than the target torque gradient although the operation speed of the intake air amount control device is limited to a lower-limit speed.

In this manner, by retarding the ignition timing, the output torque can be easily restrained from rising. The ignition timing is retarded only when the torque gradient cannot be held sufficiently small simply by limiting the operation speed of the intake air amount control device. Therefore, a deterioration in fuel consumption resulting from retardation of the ignition timing can be suppressed.

The vehicle driving unit may include a power generator driven by the internal combustion engine, and the control amount adjusting means may increase a power generation amount of the power generator when the estimated torque gradient is larger than the target torque gradient.

In this manner, by increasing the power generation amount of the power generator, the output torque of the internal combustion engine can be consumed. Thus, the output torque of the entire vehicle driving unit can be restrained from rising. Moreover, generated power can be used as a motive force and can be stored in a storage device such as a battery, a capacitor, or the like. Therefore, no energy is wasted.

In the first aspect of the invention, the control apparatus may further be equipped with reference torque calculating means for calculating an output torque at the time of a changeover from a non-driven state of the vehicle to a driven state of the vehicle (hereinafter referred to as a reference torque) from a running resistance of the vehicle, and determination means for determining whether the vehicle is in the driven state or the non-driven state by making a comparison between the reference torque and the output torque of the vehicle driving unit when the torque-up request is received. The torque-up control means may change the output torque of the vehicle driving unit according to a mode of change corresponding to a result of the determination.

In this manner, by changing over the mode of change in the output torque of the vehicle driving unit depending on whether the vehicle is in the driven state or the non-driven state, more suitable torque control can be realized. Besides, according to the comparison between the output torque and the reference torque calculated from the running resistance of the vehicle, the driven state and the non-driven state can be discriminated from each other regardless of the structure of a driving system.

The torque-up control means may increase the output torque of the vehicle driving unit to a region close to the reference torque at a maximum speed, then gradually to the reference torque, and thereafter in accordance with the target torque gradient when the vehicle is in the non-driven state.

In this manner, by increasing the output torque of the vehicle driving unit to the region close to the reference torque at the maximum speed when the vehicle is in the non-driven state, acceleration response can be enhanced. Then, by gradually increasing the output torque until the output torque reaches the reference torque, a shock caused at the time of a transition from the non-driven state of the vehicle to the driven state of the vehicle can be suppressed.

The reference torque calculating means may include road surface gradient measuring means for measuring a gradient of a road surface, and running resistance correcting means for correcting a running resistance in accordance with the gradient of the road surface.

In this manner, by correcting the running resistance, which is uniquely determined from a speed of the vehicle, in accordance with the gradient of the road surface, the driven state of the vehicle and the non-driven state of the vehicle can be accurately discriminated from each other regardless of whether the vehicle is running uphill or downhill.

The reference torque calculating means may include acceleration measuring means for measuring an acceleration acting in a longitudinal direction of the vehicle, and running resistance correcting means for correcting a running resistance in accordance with a longitudinal acceleration at the time when the torque-up request is received.

In this manner, by correcting the running resistance, which is uniquely determined from a speed of the vehicle, in accordance with the longitudinal acceleration of the vehicle at the time when the torque-up request is received, the driven state of the vehicle and the non-driven state of the vehicle can be accurately discriminated from each other regardless of whether the vehicle is running uphill or downhill.

A second aspect of the invention relates to a control method for a vehicle driving unit which has a plurality of control elements and whose output torque is controlled in accordance with control amounts of the control elements. This control method includes receiving a torque-up request issued to the vehicle driving unit from an outside, setting a target output torque of the vehicle driving unit when the torque-up request is received, changing the control amount of a specific one of the plurality of the control elements or the control amounts of specific ones of the plurality of the control elements to increase the output torque of the vehicle driving unit toward a target output torque, estimating a torque gradient upon changing the control amount of the specific one of the control elements or the control amounts of the specific ones of the control elements on the basis of a current output torque of the vehicle driving unit according to a calculation rule formulated in advance, and adjusting the control amount of at least one of the plurality of the control elements such that the estimated torque gradient approaches a predetermined target torque gradient.

According to the second aspect of the invention, the torque gradient upon changing the control amount of the specific one of the control elements or the control amounts of the specific ones of the control elements is estimated in advance, and the control amounts of the respective control elements are set such that the estimated torque gradient becomes equal to the target torque gradient. According to this configuration, the output torque can be changed with an optimal torque gradient regardless of the operational state of the vehicle driving unit, and the occurrence of a shock during acceleration can be prevented without impairing acceleration response.

BRIEF DESCRIPTION OF THE DRAWINGS

The foregoing and further features and advantages of the invention will become apparent from the following description of an example embodiment with reference to the accompanying drawings, wherein like numerals are used to represent like elements, and wherein.

DETAILED DESCRIPTION OF EMBODIMENT

The embodiment of the invention will be described hereinafter with reference to the drawings.

Figure 1:
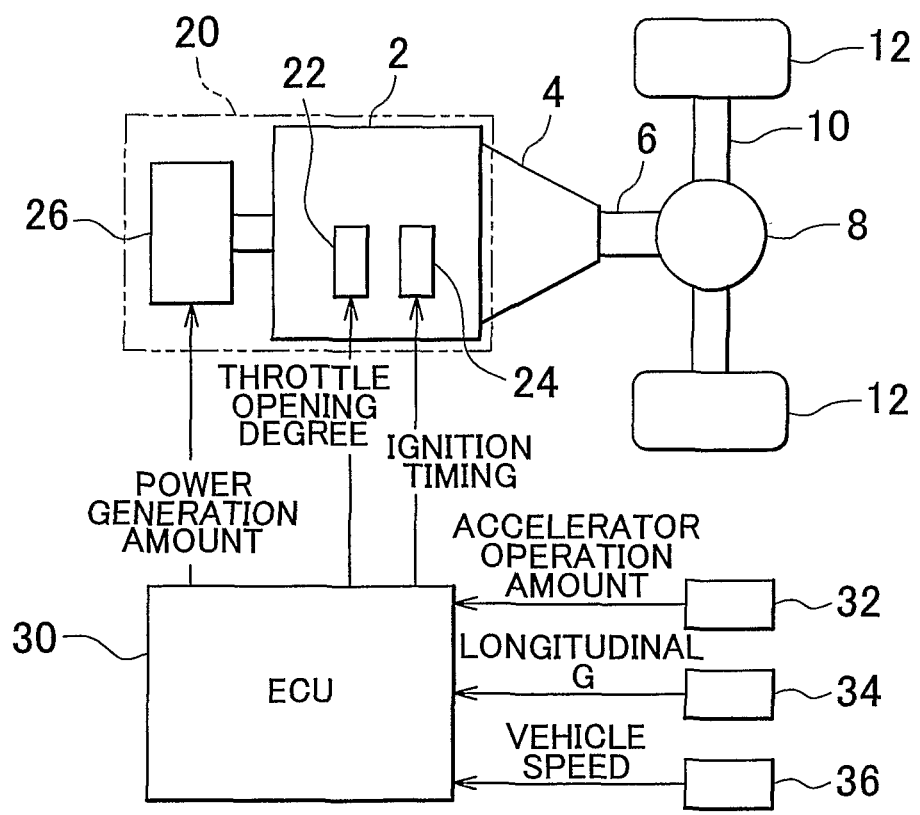
FIG. 1 is a view showing the overall configuration of a driving system of a vehicle to which a control apparatus for a vehicle driving unit as the embodiment of the invention is applied.

FIG. 1 is a view showing the overall configuration of a driving system of a vehicle to which a control apparatus for a vehicle driving unit as the embodiment of the invention is applied. First of all, the configuration of the driving system according to this embodiment of the invention will be described with reference to FIG. 1.

The driving system according to this embodiment of the invention is equipped with an internal combustion engine (hereinafter referred to as the engine) 2 as a power unit. An automatic transmission 4 is combined with the engine 2. A drive shaft 6 extends from the automatic transmission 4, and a differential gear 8 is provided at a tip of the drive shaft 6. A right driving wheel 12 and a left driving wheel 12 are connected to the differential gear 8 via an axle 10.

The engine 2 is provided with a throttle 22 for adjusting the amount of intake air, and an ignition device 24 for igniting a mixture in each cylinder. The throttle 22 and the ignition device 24 function as control elements for controlling the output torque of the engine 2 respectively. A throttle opening degree and a throttle opening speed are control amounts of the throttle 22 as the control element. An ignition timing is a control amount of the ignition device 24 as the control element. The engine 2 is fitted with actuators regarding the output torque thereof, such as a fuel injection device and the like, in addition to the throttle 22 and the ignition device 24. However, those actuators will not be described below.

The engine 2 is mounted with a plurality of auxiliaries driven by the output torque thereof. More specifically, these auxiliaries include an air-conditioning compressor (not shown), a mechanical supercharger (not shown), and the like as well as an alternator 26. These auxiliaries including the alternator 26 and the engine 2 constitute a driving unit 20 for the vehicle. An output torque of the vehicle driving unit 20 is obtained by subtracting a torque consumed by the auxiliaries from the output torque of the engine 2. The power generation amount of at least one of the auxiliaries, namely, the alternator 26 can be arbitrarily controlled. The consumed torque and hence the output torque of the vehicle driving unit change in accordance with the power generation amount of the alternator 26. That is, the alternator 26 functions as a control element for controlling the output torque of the vehicle driving unit. A power generation amount is a control amount of the alternator 26 as the control element.

The driving system according to this embodiment of the invention is equipped with an accelerator operation amount sensor 32 for outputting a signal corresponding to an accelerator operation amount, a longitudinal G sensor 34 for outputting a signal corresponding to a longitudinal acceleration (hereinafter referred to as the longitudinal G) acting on the vehicle, and a vehicle speed sensor 36 for outputting a signal corresponding to a speed of the vehicle. The signals of these sensors 32, 34, and 36 are input to an electronic control unit (ECU) 30 for controlling the entire driving system comprehensively. In this embodiment of the invention, this ECU 30 functions as the control apparatus for the vehicle driving unit. The ECU 30 decides the control amounts of the respective control elements regarding the output torque of the vehicle driving unit, such as the throttle 22, the ignition device 24, the alternator 26, and the like, on the basis of signals generated from a plurality of sensors including the above-mentioned sensors 32, 34, and 36 and other pieces of information.

Next, torque control of the vehicle driving unit that is performed in this embodiment of the invention will be described with reference to FIGS. 2 to 7.

Figure 2:
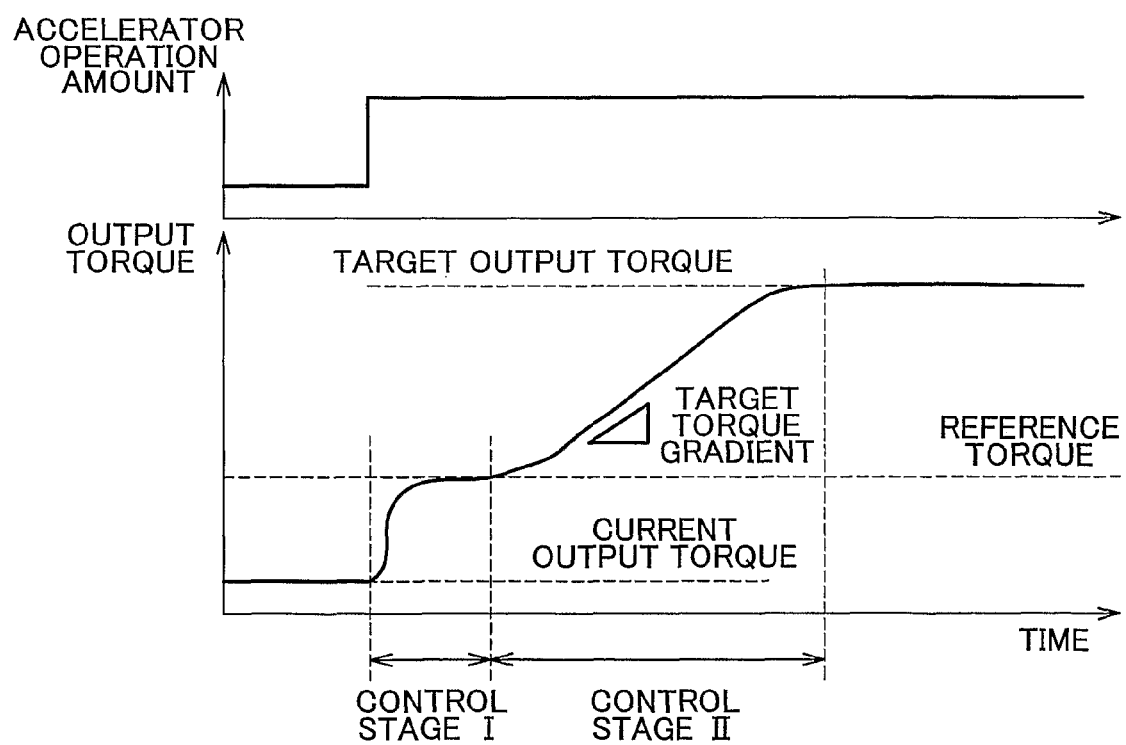
FIG. 2 is a view showing how the output torque of the vehicle driving unit changes when torque control according to the embodiment of the invention is performed.

FIG. 2 is a view showing how the output torque changes when torque control according to this embodiment of the invention is performed. First of all, the outline of torque control performed in this embodiment of the invention will be described using FIG. 2. Upon receiving a torque-up request (or an acceleration request) from the outside, the ECU 30 as the control apparatus for the vehicle driving unit 20 sets a target output torque of the vehicle driving unit 20 in accordance with a magnitude of the request. The torque-up request mentioned herein is the operation of an accelerator pedal by a driver. The ECU 30 receives the torque-up request by means of the accelerator operation amount sensor 32. The ECU 30 then sets the target output torque in accordance with the accelerator operation amount after the operation of the accelerator pedal. This function of the ECU 30 may be regarded as a function corresponding to "the torque-up request receiving means" of the invention and "the target output torque setting means" of the invention.

The ECU 30 increases the output torque of the vehicle driving unit 20 from a current output torque (an output torque at the time when the torque-up request is received) to the target output torque through two control stages I and II. This function of the ECU 30 may be regarded as a function corresponding to "the torque-up control means" of the invention.

At the first control stage I, the output torque of the vehicle driving unit 20 is increased from the current output torque to a reference torque. The reference torque is an output torque balanced with a running resistance of the vehicle. A changeover happens from a non-driven state of the vehicle to a driven state of the vehicle when the output torque reaches the reference torque. At the control stage I, torque control for preventing the occurrence of a shock upon the changeover from the non-driven state of the vehicle to the driven state of the vehicle is performed.

As described above, a plurality of gear mechanisms including the automatic transmission 4 and the differential gear 8 are interposed between the vehicle driving unit 20 and the driving wheels 12. There are minor clearances among gears. Therefore, when the vehicle is in the non-driven state, the gears loosely mesh with one another in the gear mechanisms. When the output torque of the vehicle driving unit 20 is suddenly increased in such a state, the clearances among the gears are narrowed, and an excessively large torque is input to the driving system upon the changeover from the non-driven state to the driven state. As a result, a shock is caused to the vehicle on the rebound. However, when the speed at which the output torque is increased is held low from the beginning so as to prevent the occurrence of a shock, it takes a long time to make a changeover from the non-driven state to the driven state. In consequence, the vehicle cannot be accelerated as requested.

Thus, in torque control at the control stage I, the output torque is swiftly increased to a region close to the reference torque to narrow the clearances among the gears. After having been increased to a value slightly smaller than the reference torque, the speed at which the output torque is increased is then reduced to complete the narrowing of the clearances among the gears while gradually reducing the difference between the output torque and the reference torque. According to this control, a shock caused upon a transition from the non-driven state of the vehicle to the driven state of the vehicle can be suppressed without deteriorating acceleration response. Then, when the output torque of the vehicle driving unit 20 reaches the reference torque, torque control performed by the ECU 30 transits from the control stage I to the subsequent control stage II.

At the control stage II, the output torque of the vehicle driving unit 20 is increased from the reference torque to the target output torque. The feature of torque control at the control stage II consists in that a torque gradient in increasing the output torque of the vehicle driving unit 20, namely, a speed of change in the output torque is focused on. This is because the magnitude of a shock caused during acceleration is affected by this torque gradient. When the torque gradient is too large, an excessive acceleration shock impermissible for a passenger is caused. However, when the torque gradient is reduced to suppress acceleration shock, it takes a long time until the output torque reaches the target output torque, and the vehicle cannot be accelerated as requested.

Thus, in torque control at the control stage II, a torque gradient corresponding to an upper-limit value of a permissible range of an acceleration shock is set as a target torque gradient, and the output torque of the vehicle driving unit 20 is controlled such that the actual torque gradient becomes equal to this target torque gradient. According to this control, the occurrence of an acceleration shock exceeding the permissible range can be prevented without impairing acceleration response.

Figure 3:
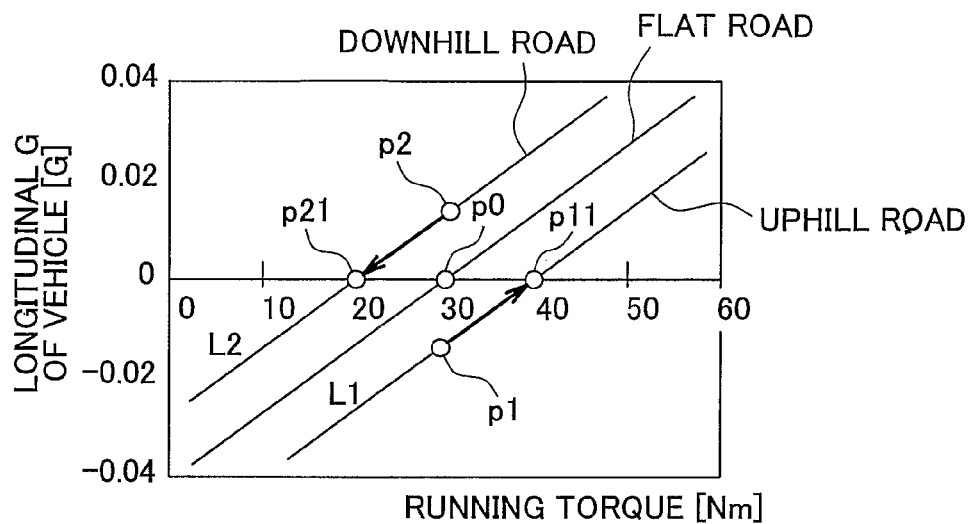
FIG. 3 is a view showing a map for calculating a reference torque from a running resistance and a longitudinal G at a control stage I.
Figure 4:
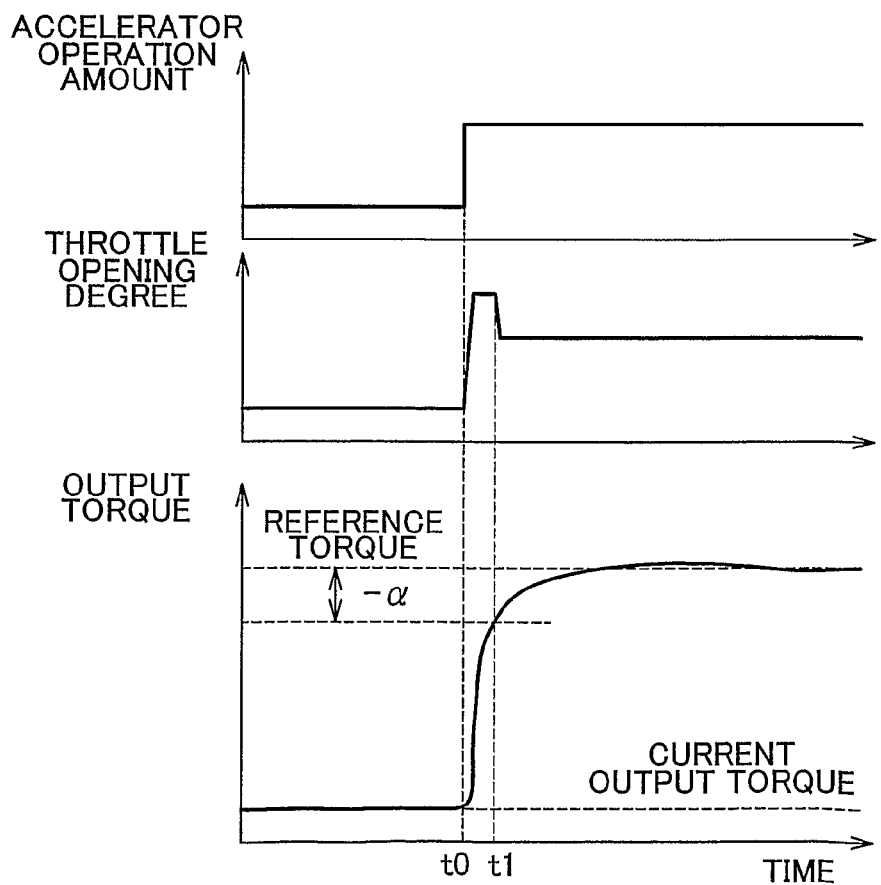
FIG. 4 is composed of time charts respectively showing accelerator operation amount, throttle opening degree, and output torque at the control stage I along the same time axis.

Details of torque control at the control stage I can be described using FIGS. 3 and 4. First of all, calculation of a reference torque will be described using FIG. 3. It can be determined whether the vehicle is in the non-driven state or the driven state from a relationship in magnitude between the current output torque and the reference torque as described above. The vehicle is in the non-driven state when the current output torque is smaller than the reference torque, and in the driven-state when the current output torque is larger than the reference torque. A comparison between the reference torque and the output torque has an advantage in that the driven state and the non-driven state can be discriminated from each other regardless of the structure of the driving system.

The reference torque can be calculated from a running resistance (road load) and a longitudinal G acting on the vehicle during steady running (before acceleration). The running resistance is a value uniquely determined by a vehicle speed. The longitudinal G acting on the vehicle during steady running represents the gradient of a road surface on which the vehicle is running. The longitudinal G is 0 when the vehicle is running on the road surface of a flat road. On the other hand, the longitudinal G is positive when the vehicle is running on the road surface of a downhill road, and is negative when the vehicle is running on the road surface of an uphill road. The absolute value of the longitudinal G increases as the gradient increases.

FIG. 3 shows a map for calculating a reference torque from a running resistance and a longitudinal G For example, in the case where a running torque of 30 Nm is calculated from the running resistance, when the longitudinal G before acceleration is 0 (i.e., when a current state is indicated by a point p0 in FIG. 3), the running torque of 30 Nm directly serves as a reference torque. In this case, the vehicle is running on a flat road surface.

On the other hand, even in the case where the running torque is the same value as mentioned above, namely, 30 Nm, when the longitudinal G before acceleration is positive (i.e., when a current state is indicated by a point p2 in FIG. 3), a torque at a point p21 (20 Nm in FIG. 3) serves as a reference torque in this state. The point p21 is an intersection point between a line L2 having a certain gradient determined from the weight of the vehicle and passing through the point p2 and a line where the longitudinal G is 0. In this case, the vehicle is running on a downhill road, and the reference torque is smaller than the running torque as described above.

When the running torque is 30 Nm and the longitudinal G before acceleration is negative (i.e., a current state is indicated by a point p1 in FIG. 3), a torque at a point p11 (40 Nm in FIG. 3) serves as a reference torque in this state. The point p11 is an intersection point between a line L1 having the same gradient as the line L2 and passing through the point p1 and the line where the longitudinal G is zero. In this case, the vehicle is running on an uphill road, and the reference torque is larger than the running torque as described above.

By calculating the reference torque on the basis of the longitudinal G before acceleration and the running resistance determined from the vehicle speed using the map described above, the driven state of the vehicle and the non-driven state of the vehicle can be accurately discriminated from each other regardless of whether the vehicle is running uphill or downhill.

Next, a method of controlling an output torque from a current output torque to a reference torque will be described using FIG. 4. The control of the output torque at the control stage I is performed by operating the throttle 22. That is, at the control stage I, the throttle 22 may be regarded as "the specific one of the control elements" according to the invention.

FIG. 4 is composed of time charts respectively showing accelerator operation amount, throttle opening degree, and output torque at the control stage I along the same time axis. As shown in FIG. 4, first of all, at a time point t0 when the accelerator pedal is depressed, the ECU 30 opens the throttle 22 to the full at a maximum speed. In other words, the ECU 30 causes the throttle opening degree to overshoot. Following this operation of the throttle 22, the output torque abruptly rises from the current output torque.

Then, at a time point t1 when the output torque has risen to a value slightly smaller than the reference torque (reference torque—α), the ECU 30 stops the overshooting of the throttle 22, and closes the throttle 22 to a throttle opening degree corresponding to the reference torque. Then, the ECU 30 maintains the throttle opening degree while the difference between the reference torque and the output torque gradually decreases and until the output torque converges to the reference torque.

According to the above-mentioned operation of the throttle, the output torque can be swiftly increased to a region close to the reference torque, and the narrowing of the clearances among the gears can be softly completed by thereafter gradually making the output torque closer to the reference torque. As a result, both the enhancement of acceleration response and the prevention of the occurrence of a shock upon a transition from the non-driven state of the vehicle to the driven state of the vehicle can be achieved.

Figure 5:
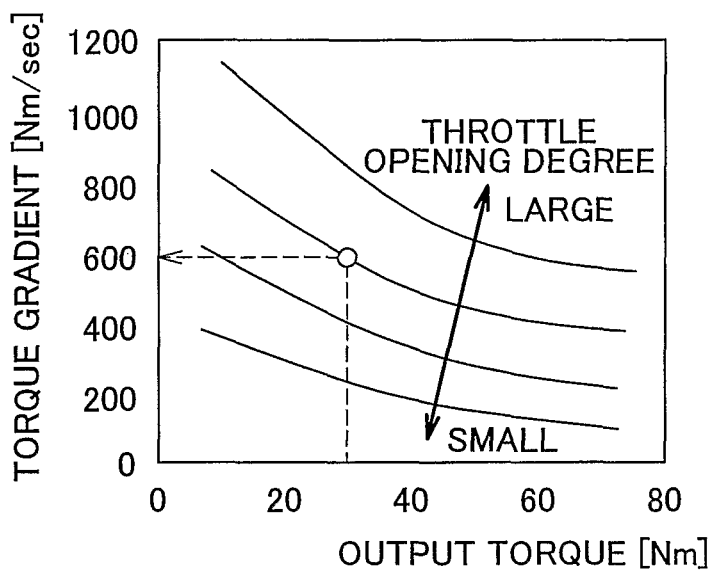
FIG. 5 is a view showing a map for calculating a torque gradient from an output torque and a throttle opening degree at a control stage II.
Figure 6:
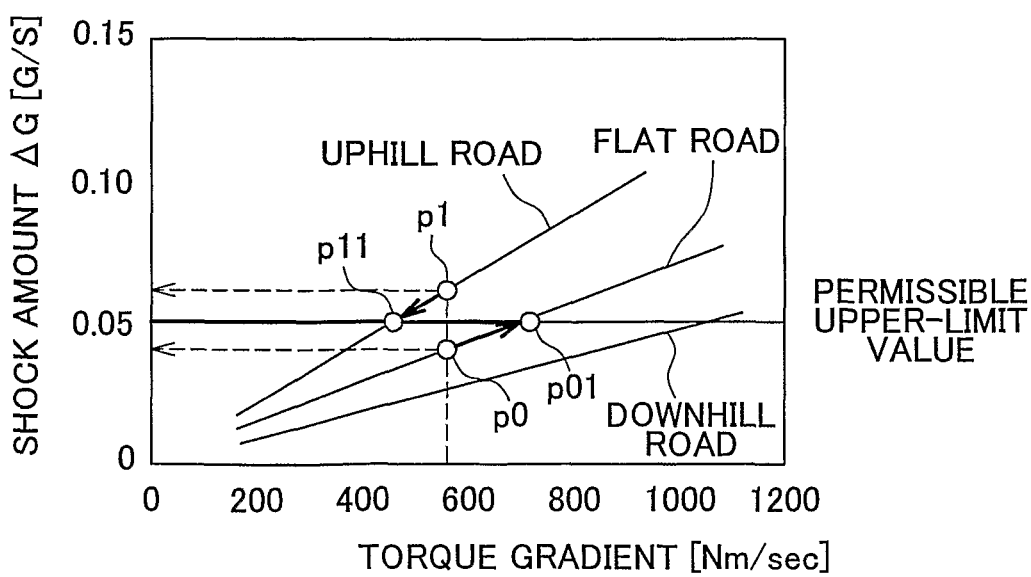
FIG. 6 is a view showing a map for calculating an amount of a shock from a torque gradient at the control stage II.

Details of torque control at the control stage II can be described using FIGS. 5 and 6. The calculation of a torque gradient that affects the magnitude of an acceleration shock will first be described using FIG. 5, and the calculation of the magnitude of the acceleration shock based on the torque gradient will then be described using FIG. 6. In this case, the magnitude of the acceleration shock is defined as a degree of change in acceleration (in a unit of G/s).

Studies conducted by the applicant have revealed that a torque gradient is determined by control amounts of the respective control elements regarding an output torque and a magnitude of a current output torque. In this embodiment of the invention, the control of the output torque at the control stage II is performed by operating the throttle 22. Therefore, a throttle opening degree and a throttle opening speed are control amounts affecting the torque gradient. That is, at the control stage II as well as the control stage I, the throttle 22 may be regarded as "the specific one of the control elements" according to the invention.

FIG. 5 shows a map for calculating a torque gradient from an output torque and a throttle opening degree. Curves shown in FIG. 5 represent relationships between output torque and torque gradient in the case where the throttle opening degree remains unchanged. As shown in FIG. 5, given that the throttle opening degree remains unchanged, the torque gradient increases as the output torque decreases. Given that the output torque remains unchanged, the torque gradient increases as the throttle opening degree increases.

FIG. 6 is a map for calculating a magnitude of an acceleration shock (shock amount) from a torque gradient. As shown in FIG. 6, there is a linear relationship between torque gradient and shock amount, and hence the shock amount increases as the torque gradient increases. However, the gradient of each characteristic line (straight line) showing a relationship between torque gradient and shock amount changes depending on the gradient of a road surface on which the vehicle is running. FIG. 6 shows respective characteristic lines as to cases where the vehicle is running on the road surface of a flat road, an uphill road, and a downhill road. Although the characteristic line for each of the uphill road and the downhill road is an example, the gradient of the characteristic line increases with increases in uphill angle, and decreases with increases in downhill angle. An uphill angle and a downhill angle can be calculated from a longitudinal G acting on the vehicle before acceleration.

A torque gradient (estimated torque gradient) at the time of a change in the throttle opening degree from a current opening degree to a target throttle opening degree is calculated from the map shown in FIG. 5. It should be noted that the target throttle opening degree is a throttle opening degree for realizing a target output torque. An amount of a shock (estimated shock amount) caused upon operation of the throttle 22 can be obtained by applying the calculated estimated torque gradient to the map shown in FIG. 6. By then making a comparison between the estimated shock amount and a preset permissible upper-limit value of the shock amount, it can be determined whether or not a suitable torque gradient is obtained with a currently set control amount of the throttle 22.

For example, in the case where the estimated torque gradient calculated according to the map shown in FIG. 5 is 600 Nm/sec, the position on the map shown in FIG. 6 is a point p0 when the vehicle is running on the road surface of a flat road, and a point p1 when the vehicle is running on the road surface of an uphill road. The shock amount at the point p0 is smaller than the permissible upper-limit value, and therefore, the torque gradient can further be increased. In this case, a torque gradient at an intersection point (a point p01) between the characteristic line for the flat road and a line representing the permissible upper-limit value can be set as a target torque gradient. On the other hand, the shock amount at the point p1 is larger than the permissible upper-limit value, and therefore, the torque gradient needs to be reduced in order to reduce the shock amount to the permissible upper-limit value. In this case, a torque gradient at an intersection point (the point p11) between the characteristic line for the uphill road and the line representing the permissible upper-limit value is set as a target torque gradient.

The ECU 30 sets the throttle opening speed to a maximum speed when the estimated torque gradient is smaller than the target torque gradient. By opening the throttle 22 at the maximum speed, the amount of intake air can be suddenly increased and hence the output torque can be swiftly raised. According to this approach, the torque gradient can be increased with ease and made closer to the target torque gradient.

On the other hand, the ECU 30 holds the throttle opening speed lower than a currently set value when the estimated torque gradient is larger than the target torque gradient. By limiting the opening speed of the throttle 22, the amount of intake air can be limited and hence the output torque can be restrained from rising. According to this approach, the torque gradient can be reduced with ease and made closer to the target torque gradient.

According to the throttle operation described above, the output torque can be changed at an optimal torque gradient regardless of the operational state of the vehicle driving unit 20, and the occurrence of an acceleration shock exceeding a permissible range can be prevented without impairing acceleration response. By using the map shown in FIG. 6 to calculate the target torque gradient, the influence of the gradient of the road surface on the magnitude of the shock amount can be eliminated, and both the enhancement of acceleration response and the prevention of an acceleration shock can always be achieved regardless of whether the vehicle is running uphill or downhill.

The function of the ECU 30 at the control stage II described above may be regarded as a function corresponding to "the torque gradient estimating/calculating means" of the invention and "the control amount adjusting means" of the invention.

Finally, the overall flow of torque control performed in this embodiment of the invention will be described using FIG. 7. A flowchart of FIG. 7 shows a routine for torque control of the vehicle driving unit 20 that is performed by the ECU 30.

Figure 7:
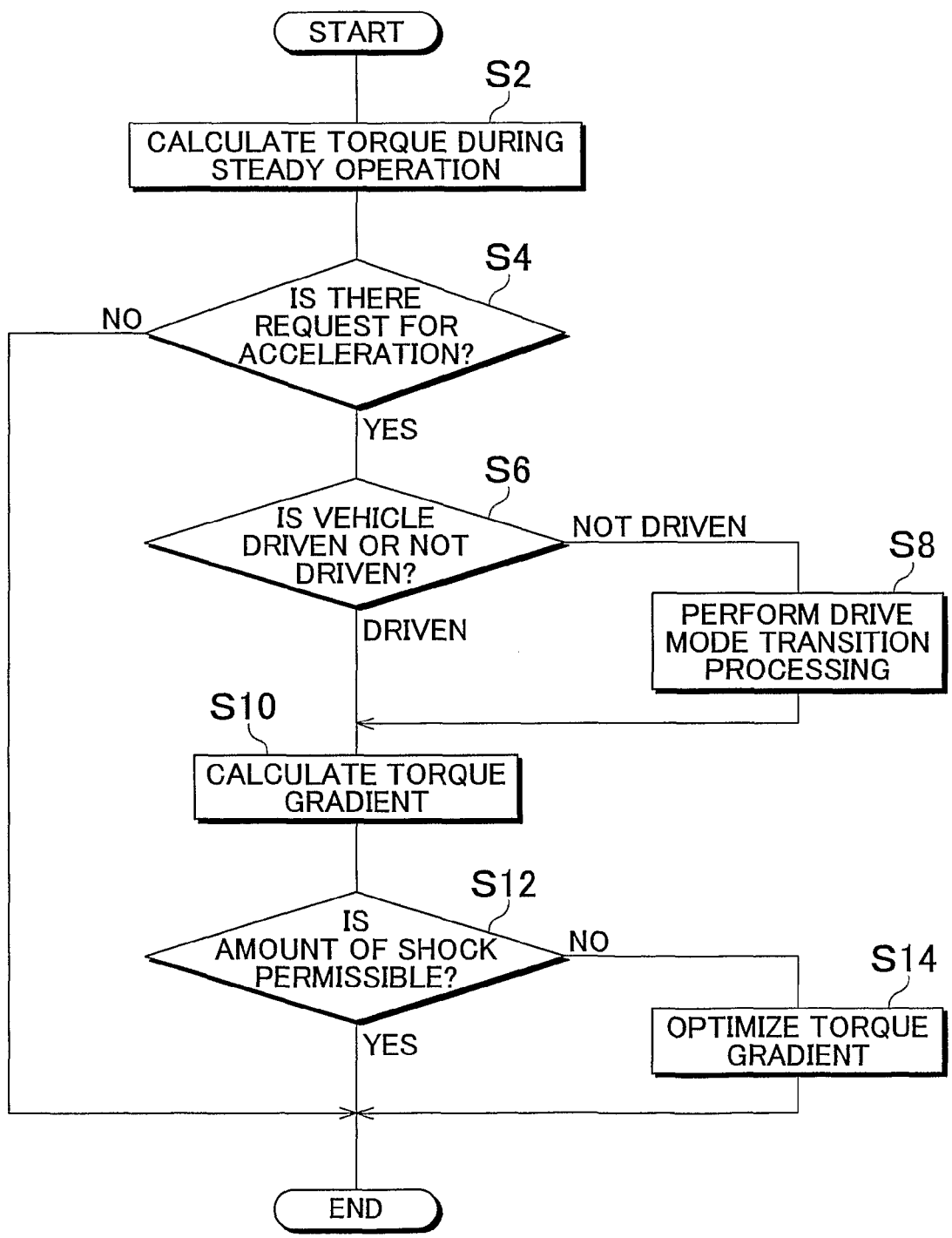
FIG. 7 is a flowchart showing a routine for torque control of the vehicle driving unit that is performed in the embodiment of the invention.

In a first step S2 of the routine shown in FIG. 7, a torque during steady operation (torque before acceleration) is calculated from control amounts of the respective control elements of the vehicle driving unit 20, using the maps stored in advance in the ECU 30. Then in step S4, it is determined on the basis of an output signal of the accelerator operation amount sensor 32 whether or not there is a request for acceleration from a driver. When there is no request for acceleration, the present routine is terminated.

When it turns out through the determination in step S4 that there is a request for acceleration from the driver, a determination in step S6 is then made. It is determined in step S6 whether the vehicle is in a driven state or a non-driven state. When the vehicle is already in the driven state, a processing of step S10 is then performed. On the other hand, when the vehicle is in the non-driven state, a drive mode transition processing of step S8 is performed, and a processing of step S10 is then performed. The drive mode transition processing is throttle control at the control stage I that has been described using FIG. 4.

In step S10, a torque gradient (estimated torque gradient) is calculated from a current output torque and a target throttle opening degree. It is then determined in step S12 whether or not an amount of a shock caused at the estimated torque gradient coincides with a permissible upper-limit value. When it turns out through the determination that the amount of the shock coincides with the permissible upper-limit value, a value currently set as a throttle opening speed is directly used, and the throttle 22 is operated on the basis of this throttle opening speed.

When it turns out through the determination in step S12 that the amount of the shock does not coincide with the permissible upper-limit value, a torque gradient optimization processing is performed in step S14. The torque gradient optimization processing is throttle control at the control stage II that has been described using FIGS. 5 and 6. The throttle opening speed is set again through this optimization processing, and the throttle 22 is operated on the basis of the throttle opening speed set again.

Although the embodiment of the invention has been described above, the invention should not be limited to the foregoing embodiment thereof but can be implemented after being modified in various manners without departing from the spirit thereof. For example, the invention may be implemented after being modified as follows.

In the foregoing embodiment of the invention, the longitudinal G sensor 34 measures the longitudinal G to calculate the reference torque. However, a gradient sensor may be provided instead of the longitudinal G sensor 34, and a reference torque may be calculated from a running resistance and an angle of inclination of a road surface that has been measured by the gradient sensor. Further, the reference torque may be calculated using mathematical expressions instead of the maps. The angle of inclination of the road surface that has been measured by the gradient sensor can also be used to select an appropriate one of the characteristic lines in the map shown in FIG. 6.

The gradients of the respective characteristic lines in the map shown in FIG. 6 may be learned from a result obtained by measuring an amount of a shock actually caused to the vehicle during acceleration. The amount of the shock can be calculated using a degree of change in the longitudinal G measured by the longitudinal G sensor 34. In that case, a factor resulting from a change in the weight of the vehicle and a factor resulting from the gradient of the road surface may be learned separately. This is because of the following reason. The total weight of the vehicle changes depending on the number of passengers, and when the weight of the vehicle increases or decreases, the inertial force of the vehicle also changes in accordance with the increase or decrease in the weight of the vehicle to make the magnitude of an acceleration shock different. By making this learning function available, the robustness against changes in the state of the vehicle in measures against an acceleration shock can be enhanced.

In the foregoing embodiment of the invention, the throttle 22 controls the amount of intake air. However, the throttle 22 is an example of "the intake air amount control device" of the invention. In the case a variable valve operating mechanism capable of variably controlling the angle of action of intake valves and the maximum lift amount of the intake valves is provided, the intake valves equipped with this variable valve operating mechanism may control the amount of intake air and hence the output torque of the engine 2. The angle of action, the maximum lift amount, and the speed at which the angle of action or the maximum lift amount is changed may be regarded as control amounts of each of the intake valves as a control element.

In the foregoing embodiment of the invention, the throttle 22 controls the output torque. In some cases, however, torque control through retardation of the ignition timing may be combined with the control of the output torque by the throttle 22. More specifically, the ignition timing is retarded only when the torque gradient cannot be held sufficiently small although the throttle opening speed has been limited at the control stage II. A deterioration in acceleration response occurs when the throttle opening speed is limited too much. However, the addition of the retardation of the ignition timing makes it possible to easily suppress a rise in the output torque without impairing acceleration response. By retarding the ignition timing only when the torque gradient cannot be held small simply by limiting the throttle opening speed, a deterioration in fuel consumption can be prevented from being caused through frequent retardation of the ignition timing.

At the control stage II, the torque gradient may be adjusted by controlling the power generation amount of the alternator 26. More specifically, by increasing the power generation amount of the alternator 26, the output torque of the engine 2 can be consumed and hence the output torque of the entire vehicle driving unit 20 can be restrained from rising. In addition, the power generated by the alternator 26 can be used as a motive force and can also be stored in a storage device such as a battery, a capacitor, or the like. Therefore, no energy is wasted. Torque reduction resulting from power generation control of the alternator 26 has a good response. Therefore, by combining this torque reduction with the torque control by the throttle 22, the opening speed of the throttle 22 can always be set at the maximum speed.

Furthermore, torque control making use of the consumption of torque by the alternator 26 can be utilized at the control stage I as well. In that case, the throttle 22 is opened to the target throttle opening degree from the beginning, and the power generation amount of the alternator 26 is suddenly increased as soon as the output torque reaches the region close to the reference torque, so that the output torque gently converges to the reference torque. According to this approach, a shock caused upon a transition from the non-driven state of the vehicle to the driven state of the vehicle can be suppressed without operating the throttle 22 in a closing direction thereof.

In the driving system shown in FIG. 1, the vehicle driving unit 20 has the engine 2 as the only power unit. However, the invention is also applicable to a vehicle driving unit of a hybrid system having an electric motor as a power unit in addition to an engine. The invention is also applicable to a vehicle driving unit having an electric motor as the only power unit. The engine mountable on the vehicle driving unit to which the invention is applied is not limited to an engine of an intake air amount demand type whose torque is controlled by controlling the amount of intake air as in the case of the foregoing embodiment of the invention. The engine mountable on the vehicle driving unit to which the invention is applied may be an engine of a fuel injection amount demand type (e.g., a diesel engine) whose torque is controlled by controlling the amount of fuel injection.

The invention claimed is:

1. A control apparatus for a vehicle driving unit including an internal combustion engine including a plurality of control elements and whose output torque is controlled in accordance with control amounts of the control elements, comprising:

a torque-up request receiving section that receives a torque-up request issued to the vehicle driving unit;

a target output torque setting section that sets a target output torque of the vehicle driving unit when the torque-up request is received;

a torque-up control section that changes the control amount of a specific one of the plurality of the control elements, wherein the specific one of the control elements is an intake air amount control device of the internal combustion engine, or the control amounts of specific ones of the plurality of the control elements to increase the output torque of the vehicle driving unit toward the target output torque;

a torque gradient estimating section that estimates a torque gradient upon changing the control amount of the specific one of the control elements or the control amounts of the specific ones of the control elements on a basis of a current output torque of the vehicle driving unit according to a calculation rule formulated in advance; and a control amount adjusting section that adjusts the control amount of at least one of the plurality of the control elements such that the estimated torque gradient approaches a predetermined target torque gradient.

2. The control apparatus according to claim 1, wherein the target torque gradient is set such that a magnitude of a shock caused to a vehicle at a time of torque-up becomes equal to a predetermined permissible upper-limit value.

3. The control apparatus according to claim 1, further comprising:
    a road surface gradient measuring section that measures a gradient of a road surface; and
    a target torque gradient correcting section that corrects the target torque gradient in accordance with the gradient of the road surface.

4. The control apparatus according to claim 3, further comprising:
    an acceleration measuring section that measures an acceleration acting in a longitudinal direction of the vehicle; and
    a learning section that learns a correction amount of the target torque gradient for the gradient of the road surface on a basis of the measured longitudinal acceleration acting at a time of torque-up.

5. The control apparatus according to claim 1, wherein the control amount adjusting section sets an operation speed of the intake air amount control device to a maximum speed when the estimated torque gradient is smaller than the target torque gradient.

6. The control apparatus according to claim 1, wherein the control amount adjusting section limits an operation speed of the intake air amount control device when the estimated torque gradient is larger than the target torque gradient.

7. The control apparatus according to claim 6, wherein the control amount adjusting section retards an ignition timing of an ignition device of the internal combustion engine when the estimated torque gradient is larger than the target torque gradient although the operation speed of the intake air amount control device is limited to a lower-limit speed.

8. The control apparatus according to claim 1, wherein:
    the vehicle driving unit includes a power generator driven by the internal combustion engine; and
    the control amount adjusting section increases a power generation amount of the power generator when the estimated torque gradient is larger than the target torque gradient.

9. The control apparatus according to claim 1, further comprising:
    a reference torque calculating section that calculates a reference torque, which is an output torque at a time of a changeover from a non-driven state of the vehicle to a driven state of the vehicle, from a running resistance of the vehicle; and
    a determination section that determines whether the vehicle is in the driven state or the non-driven state by making a comparison between the reference torque and the output torque of the vehicle driving unit when the torque-up request is received, wherein
    the torque-up control section changes the output torque of the vehicle driving unit according to a mode of change corresponding to a result of the determination.

10. The control apparatus according to claim 9, wherein the torque-up control section increases the output torque of the vehicle driving unit to a region close to the reference torque at a maximum speed, then increases the output torque gradually to the reference torque, and thereafter increases the output torque in accordance with the target torque gradient when the vehicle is in the non-driven state.

11. The control apparatus according to claim 9, wherein the reference torque calculating section includes: a road surface gradient measuring section that measures a gradient of a road surface; and a running resistance correcting section that corrects a running resistance in accordance with the gradient of the road surface.

12. The control apparatus according to claim 9, wherein the reference torque calculating section includes: an acceleration measuring section that measures an acceleration acting in a longitudinal direction of the vehicle; and a running resistance correcting section that corrects a running resistance in accordance with a longitudinal acceleration at a time when the torque-up request is received.

13. A control method for a vehicle driving unit including an internal combustion engine, including a plurality of control elements and whose output torque is controlled in accordance with control amounts of the control elements, comprising:
    receiving a torque-up request issued to the vehicle driving unit;
    setting a target output torque of the vehicle driving unit when the torque-up request is received;
    changing the control amount of a specific one of the plurality of the control elements, wherein the specific one of the control elements is an intake air amount control device of the internal combustion engine or the changing the control amounts of specific ones of the plurality of the control elements to increase the output torque of the vehicle driving unit toward a target output torque;
    estimating a torque gradient upon changing the control amount of the specific one of the control elements or the control amounts of the specific ones of the control elements on a basis of a current output torque of the vehicle driving unit according to a calculation rule formulated in advance; and
    adjusting the control amount of at least one of the plurality of the control elements such that the estimated torque gradient approaches a predetermined target torque gradient.

* * * * *